United States Patent
Hisatomi et al.

(10) Patent No.: US 7,455,334 B2
(45) Date of Patent: Nov. 25, 2008

(54) LATCH DEVICE REQUIRING NO COMPLEXLY OPERATING FOR PREVENTING MALFUNCTION THEREOF

(75) Inventors: Kazukuni Hisatomi, Tokyo (JP); Kazushi Kamata, Aomori (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/493,646

(22) Filed: Jul. 26, 2006

(65) Prior Publication Data
US 2007/0024065 A1 Feb. 1, 2007

(30) Foreign Application Priority Data
Jul. 26, 2005 (JP) ............... 2005-216425

(51) Int. Cl.
*E05C 19/06* (2006.01)
(52) U.S. Cl. .................. 292/80; 292/DIG. 4; 361/725; 361/726; 361/732
(58) Field of Classification Search .................. 292/80, 292/6, 45, 129, 34, DIG. 4, DIG. 38, 341.17, 292/300, DIG. 55, DIG. 51, 49, 198, 19, 292/341.15
See application file for complete search history.

(56) References Cited

U.S. PATENT DOCUMENTS 4,270,781 A * 6/1981 Nishimura ............... 292/251.5
4,660,871 A * 4/1987 Arakawa et al. ............... 292/81
4,792,165 A * 12/1988 Nishimura .................... 292/19
4,961,710 A 10/1990 Komatsu
7,108,525 B2 9/2006 Hisatomi
7,217,879 B2 5/2007 Ito

FOREIGN PATENT DOCUMENTS

| JP | 1-150387 | 10/1989 |
|---|---|---|
| JP | 2003-86289 | 3/2003 |
| JP | 2004 87201 | 3/2004 |
| JP | 2006-038170 | 2/2006 |

OTHER PUBLICATIONS

Japanese Office Action and English translation of relevant portions.
Japanese Office Action dated May 21, 2008.

* cited by examiner

*Primary Examiner*—Carlos Lugo
*Assistant Examiner*—Mark Williams
(74) *Attorney, Agent, or Firm*—Collard & Roe, P.C.

(57) ABSTRACT

For latching an object member, a latch member is mounted on a base member so as to be movable between a first position where the latch member does not engage the object member and a second position where the latch member engages the object member. Movement of the latch member is controlled depending on the number of times of movement of a cam member which is mounted on the base member for following movement of the object member. A lock member is interposed between the base member and at least one of the cam member and the latch member. The lock member is movable between a lock position for limiting movement of at least one of the cam member and the latch member and a non-lock position for not limiting movement of at least one of the cam member and the latch member.

9 Claims, 17 Drawing Sheets

LATCH DEVICE REQUIRING NO COMPLEXLY OPERATING FOR PREVENTING MALFUNCTION THEREOF

This application claims priority to prior Japanese patent application JP2005-216425, the disclosure of which is incorporated herein by reference.

BACKGROUND OF THE INVENTION

This invention relates to a latch device for latching an object member that is movable in a predetermined direction.

Recently, it has been proposed to use, as an object member that is loadable and unloadable into and from an information processing device, a module in the form of a case and a CD, CD-ROM, DVD, HD, or the like that is accommodated in the case (hereinafter referred to simply as a "module"). In order to enable the use of the module, the information processing device has a housing formed with an insertion hole. The module is inserted into the insertion hole depending on necessity. When the module is replaced with another or becomes unnecessary, it is removed from the insertion hole.

The information processing device is provided with a latch device that serves to lock the module in the state where it is inserted in the insertion hole. The latch device of this type normally has a release mechanism for releasing the module. The release mechanism has a movable operating member to be operated from the exterior and releases the module depending on an operation of the operating member. The released module can be easily removed from the information processing device.

The information processing device of the type is often carried with being contained in a bag or the like in a state where the module is latched in the insertion hole. During this carrying state, it is assumed as a particular case that the module is pushed by unexpected outside power or receives the impact by the fall of the information processing device. In the particular case, the module might be unlatched and therefore removed from the information processing device. In order to prevent such removal of the module, the information processing device may be provided with a slide-type lock mechanism which is operated by a hand working to lock the module in a latch state thereof. However, the hand working is troublesome and has complication.

SUMMARY OF THE INVENTION

It is therefore an object of the present invention to provide a latch device capable of preventing the malfunction thereof without complexly operating being necessary.

It is another object of the present invention to provide the latch device of the type described, in which a latch state thereof is automatically locked when the latch device inclines.

Other object of the present invention will become clear as the description proceeds.

According to an aspect of the present invention, there is provided a latch device for latching an object member that is movable in a predetermined direction, the latch device comprising a base member, a cam member mounted on the base member for following movement of the object member, a latch member mounted on the base member and movable between a first position where the latch member does not engage the object member and a second position where the latch member engages the object member, a control mechanism coupled to the cam member and the latch member for controlling movement of the latch member depending on the number of times of movement of the cam member, and a lock member interposed between the base member and at least one of the cam member and the latch member for locking the latch member at the second position to prevent a release of the object member from the latch device, the lock member being movable between a lock position where the lock member limits movement of at least one of the cam member and the latch member relative to the base member and a non-lock position where the lock member does not limit movement of at least one of the cam member and the latch member relative to the base member.

DESCRIPTION OF THE PREFERRED EMBODIMENT

Figure 1:
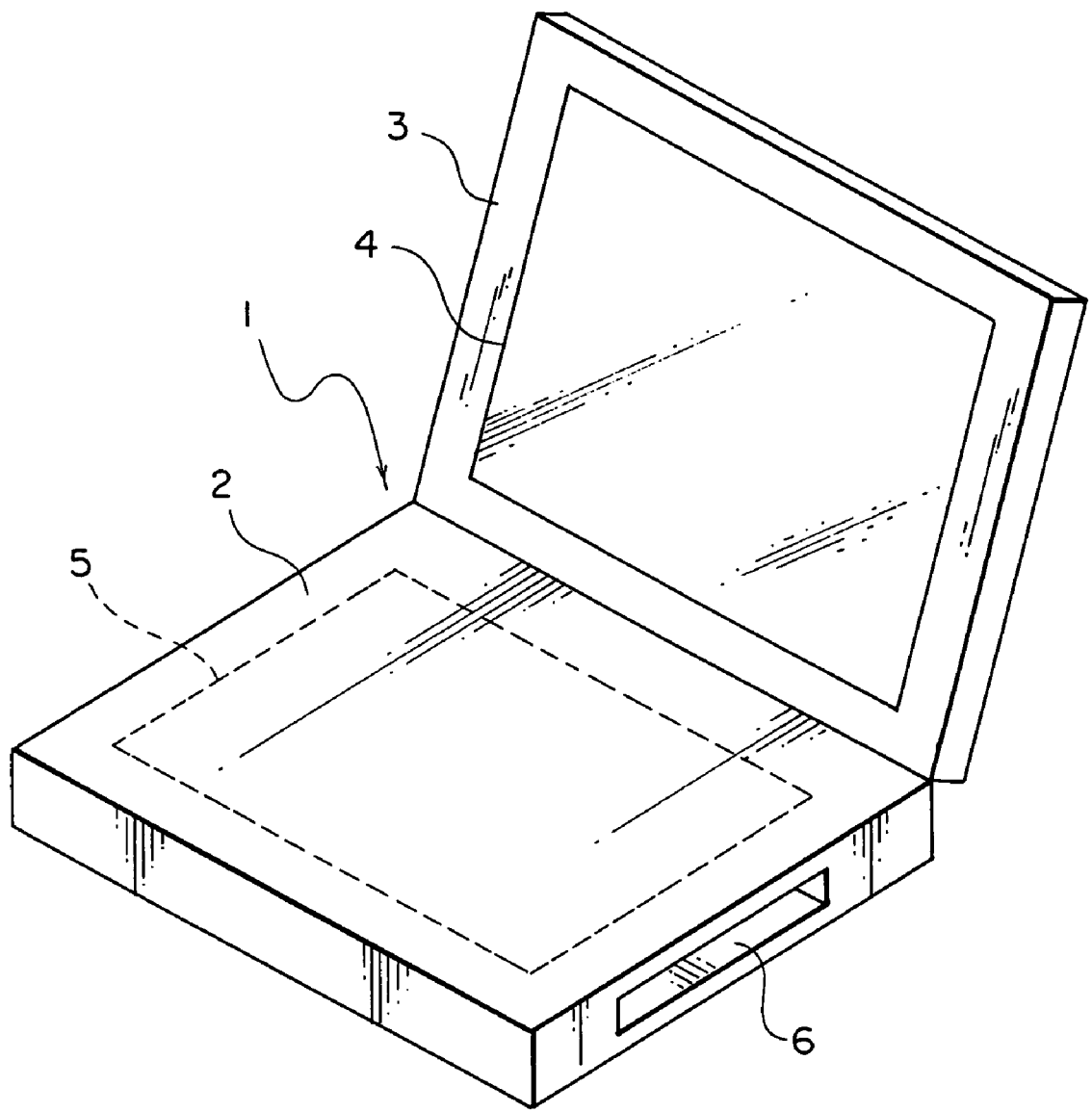
FIG. 1 is a schematic perspective view showing the overall appearance of an information processing device according to an embodiment of the present invention.

Referring to FIG. 1, description will be given of an information processing device according to an embodiment of the present invention.

The illustrated information processing device is designated by a reference numeral 1 and is, for example, a laptop personal computer and comprises a body portion 2 and a cover portion 3 attached to the body portion 2 so as to be openable and closable. The cover portion 3 has a display 4. The body portion 2 is provided with an operating portion 5 such as a keyboard.

A housing of the body portion 2 is formed with an insertion hole 6 for enabling use of a module of a flat plate shape as an object member. The module is inserted into the insertion hole 6 depending on necessity. When the module is replaced with another or becomes unnecessary, it is removed from the insertion hole 6 and separated from the information processing device 1.

Figure 2:
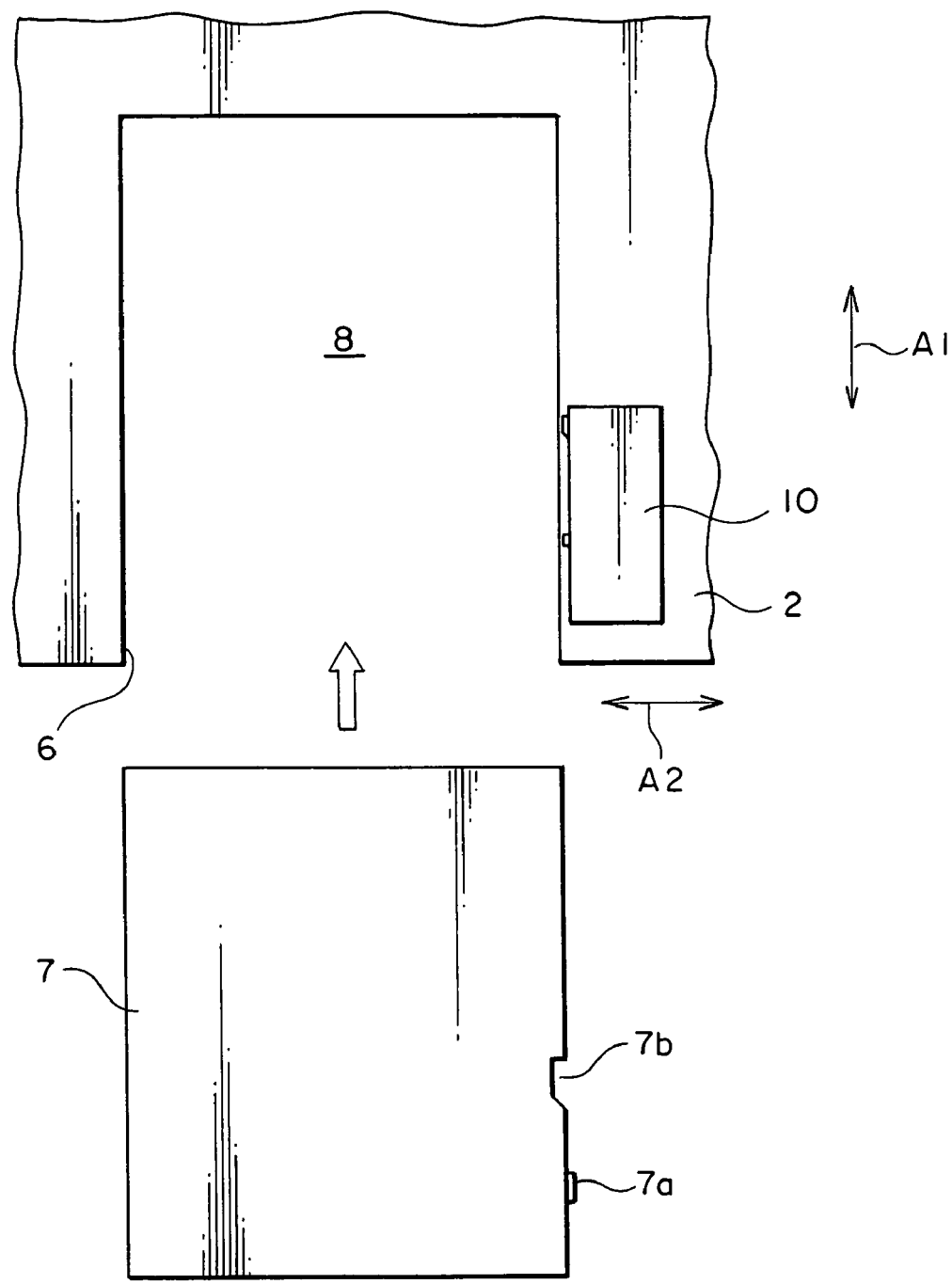
FIG. 2 is an explanatory diagram showing, on an enlarged scale, the main part of the information processing device of FIG. 1 along with a module.

Referring also to FIG. 2, a module 7 is being inserted into the insertion hole 6. Inside the body portion 2, a passage 8 is formed so as to extend in a horizontal first direction (predetermined direction) A1 following the insertion hole 6. Therefore, the module 7 inserted into the insertion hole 6 is located in the passage 8. The module 7 has a projected portion 7a and a recessed portion 7b formed on a side surface thereof.

A latch device 10 is disposed on a lateral side of the passage 8 in a horizontal second direction A2 perpendicular to the first direction A1. The latch device 10 serves to latch the module 7 in the inserted state. The latch device 10 is firmly fixed to the housing of the body portion 2.

Referring also to FIGS. 3A to 12C, description will be given of a structure of the latch device 10.

Figures 3A, 3B:
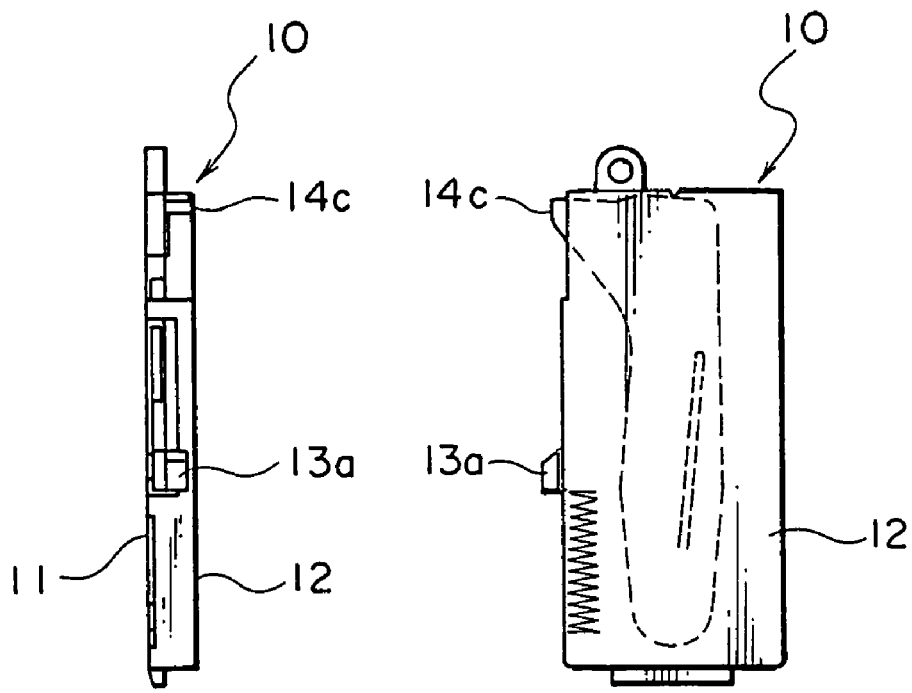
FIG. 3A is a front view of a latch device used in the information processing device of FIG. 1.
FIG. 3B is a left-side view of the latch device shown in FIG. 3A.
Figure 3C:
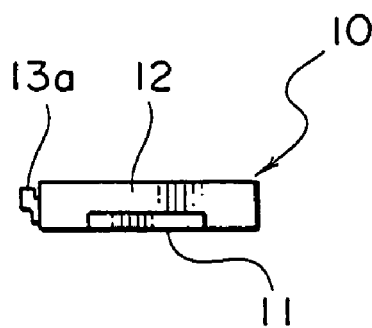
FIG. 3C is a bottom view of the latch device shown in FIG. 3A.

In FIGS. 3A to 3C, the latch device 10 comprises a base member 11 and a cover member 12 coupled to the base member 11. The base member 11 is made of an insulating material or a metal material. The cover member 12 is formed by a metal plate and fixedly engaged with the base member 11.

Figure 4:
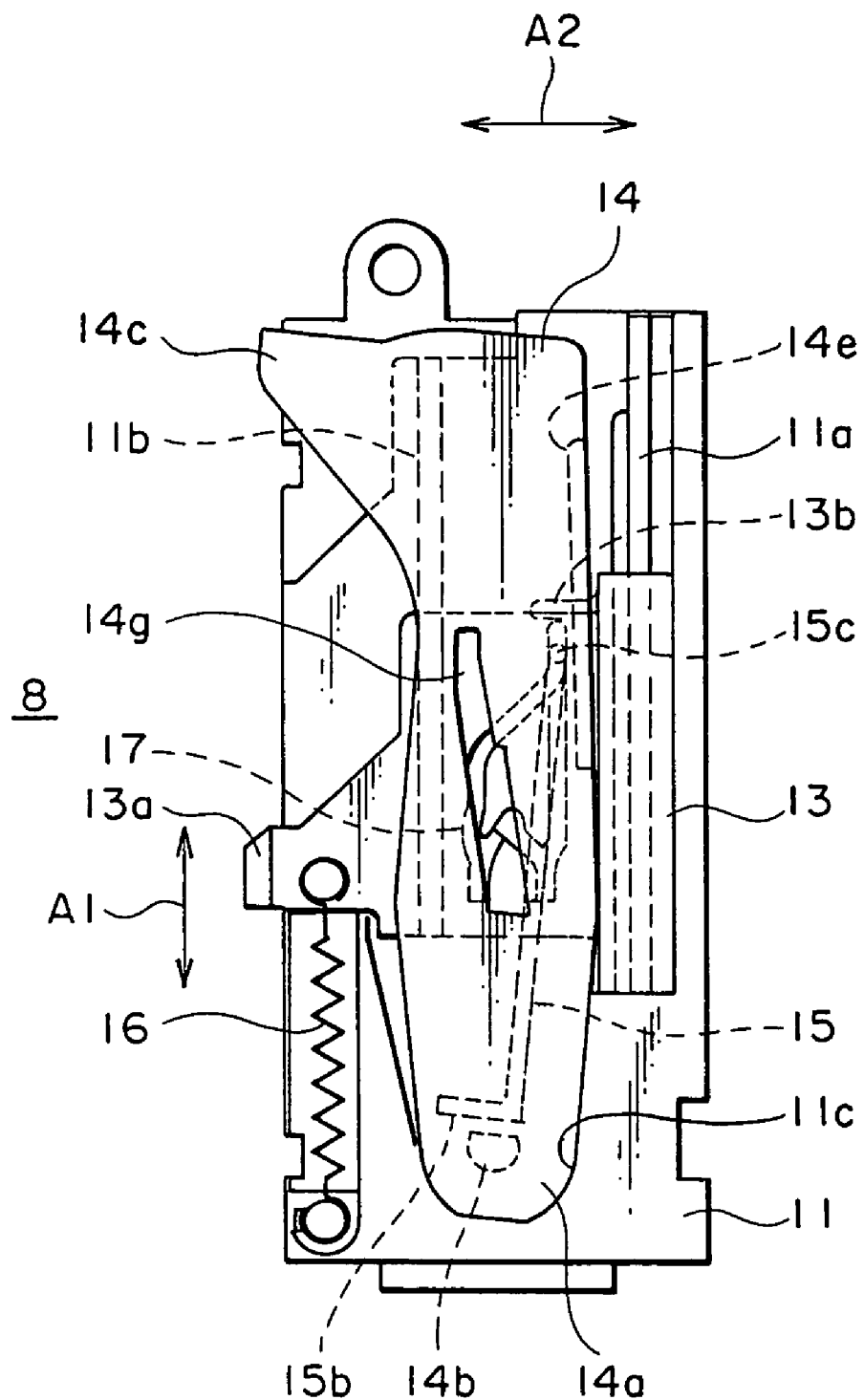
FIG. 4 is a front view showing, on an enlarged scale, the latch device of FIGS. 3A to 3C in the state where a cover member is detached.

As seen from FIG. 4 where the cover member 12 is detached, a cam member 13, a latch member 14, a rod spring 15, and a return spring 16 are disposed between the base member 11 and the cover member 12. The cam member 13 and the latch member 14 are each made of an insulating resin or a metal material. On the other hand, the rod spring 15 and the return spring 16 are each formed by a metal member having springiness. For convenience of illustration, the return spring 16 is exemplarily illustrated.

Figure 5:
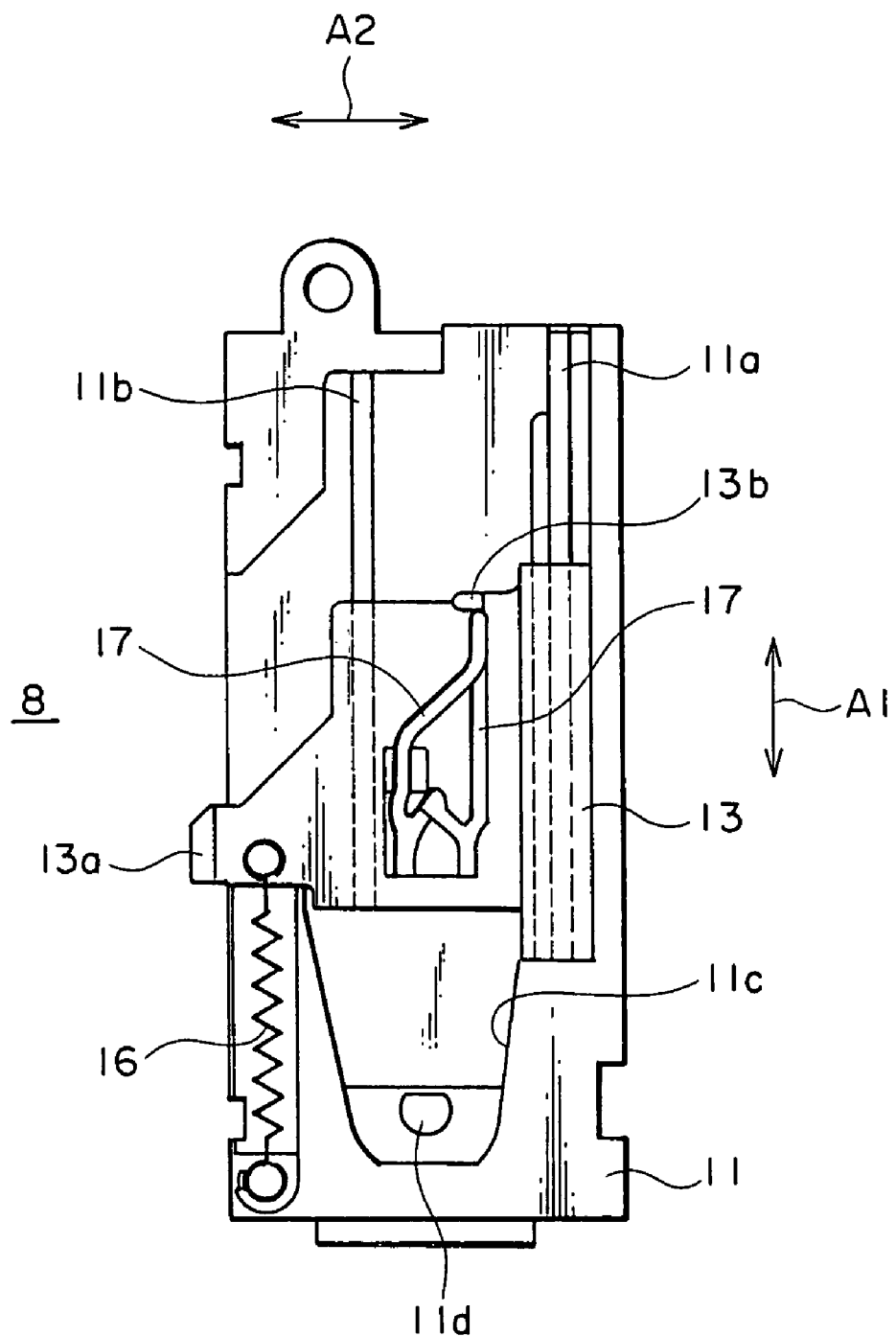
FIG. 5 is a front view of an assembly formed by a base member, a cam member, and a return spring which are included in the latch device of FIGS. 3A to 3C.

In FIG. 5, the base member 11 has guide rails 11a and 11b on an upper surface thereof. The cam member 13 is attached to the base member 11 so as to be slidable only in the first directions A1 along the guide rails 11a and 11b. The cam member 13 may be called a sliding member. The return spring 16 is a tension coil spring having opposite ends connected to the base member 11 and the cam member 13, respectively, and urges the cam member 13 toward the side of the insertion hole 6 in the first direction A1. Part of the cam member 13 protrudes into the passage 8 as an operating projection 13a.

On an upper surface of the cam member 13 is formed a heart cam 17 in the form of a generally heart-shaped groove that is substantially parallel to a predetermined plane spreading in the first and second directions A1 and A2. A specific shape of the heart cam 17 will be described in detail later.

The base member 11 further has a recessed portion 11c and a projected portion 11d near the return spring 16. As shown in FIG. 4, the latch member 14 is mounted on the upper side of the cam member 13. In that event, an end portion 14a of the latch member 14 is disposed in the recessed portion 11c. Then, a shaft hole 14b of the latch member 14 is fittingly engaged with the projected portion 11d. The end portion 14a of the latch member 14 is made slightly smaller than the recessed portion 11c so that the latch member 14 is swingable about the projected portion 11d as a fulcrum along the predetermined plane only in a certain angle range.

The latch member 14 has an engaging portion 14c formed at the other end portion thereof, i.e. a free end thereof. The engaging portion 14c can protrude into the passage 8 from the base member 11 and the cover member 12 substantially in the second direction A2 depending on a swing angle of the latch member 14. In other words, the latch member 14 is movable between a first position where the engaging portion 14c does not engage the module 7 and a second position where the engaging portion 14c engages the module 7 in the first direction A1.

Figure 6:
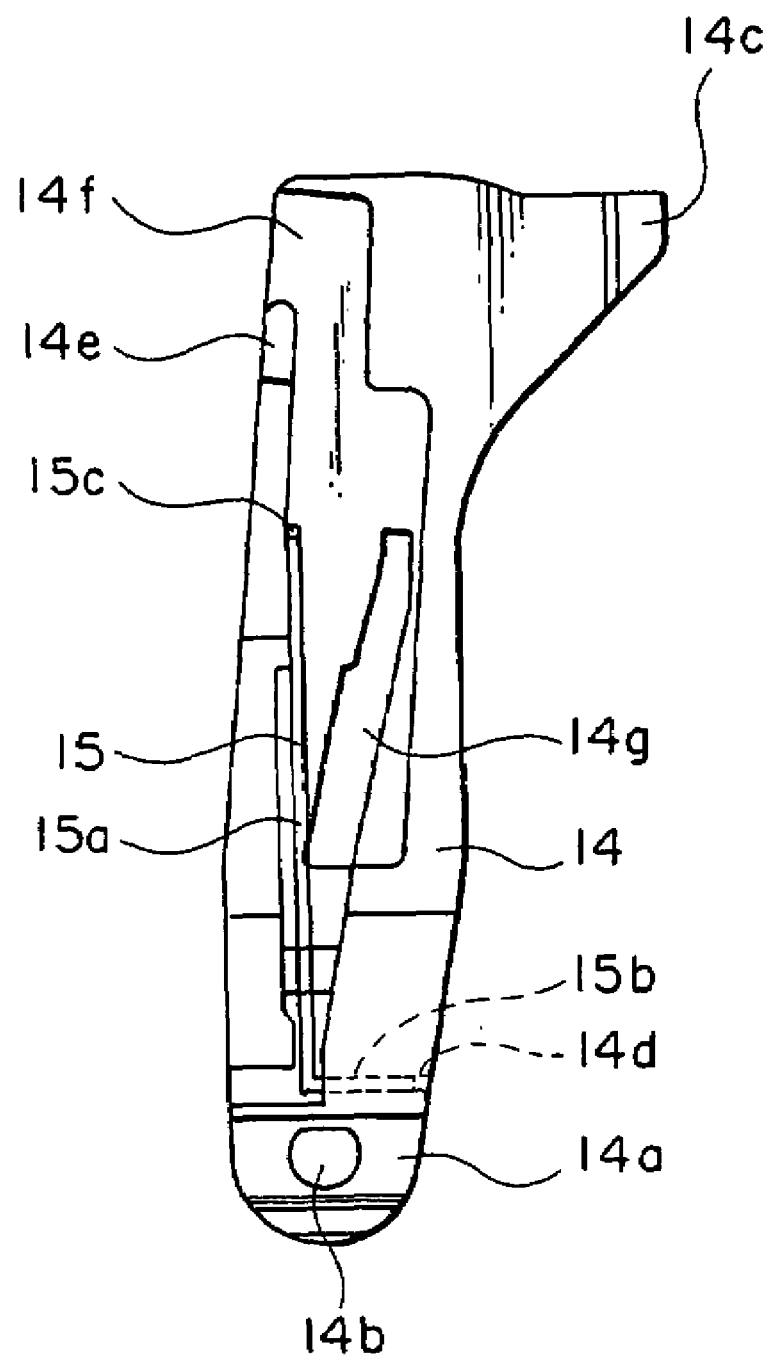
FIG. 6 is a bottom view of an assembly formed by a latch member and a rod spring which are included in the latch device of FIGS. 3A to 3C.
Figure 7B:
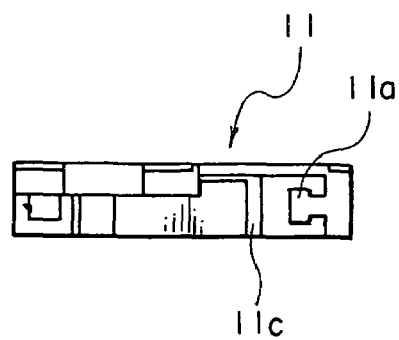
FIG. 7B is a plan view of the base member shown in FIG. 7A.
Figure 7A:
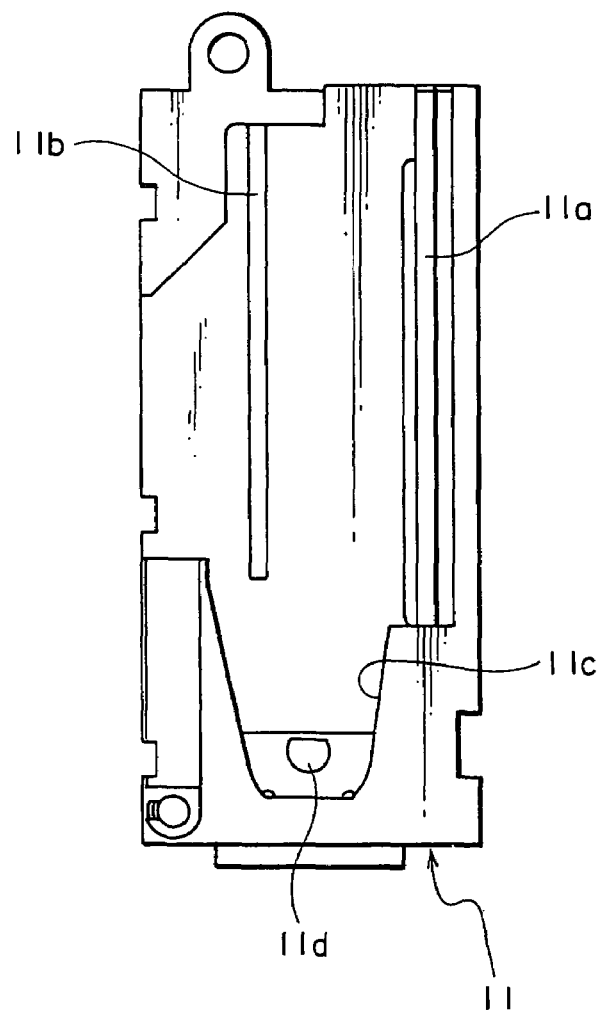
FIG. 7A is a front view of the base member included in the latch device of FIGS. 3A to 3C.
Figure 8A:
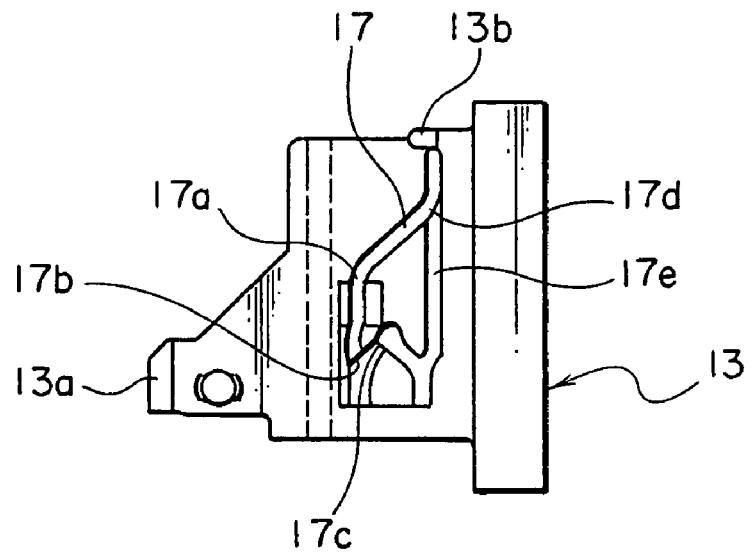
FIG. 8A is a front view of the cam member included in the latch device of FIGS. 3A to 3C.
Figure 8B:
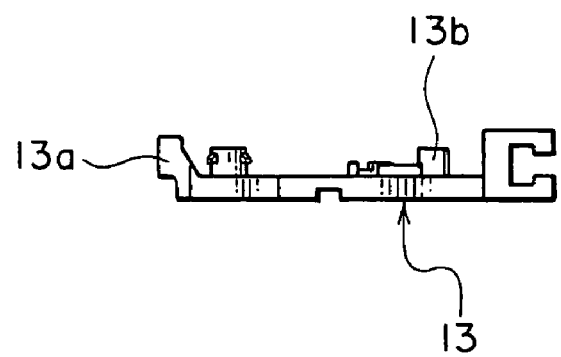
FIG. 8B is a bottom view of the cam member shown in FIG. 8A.
Figure 9A:
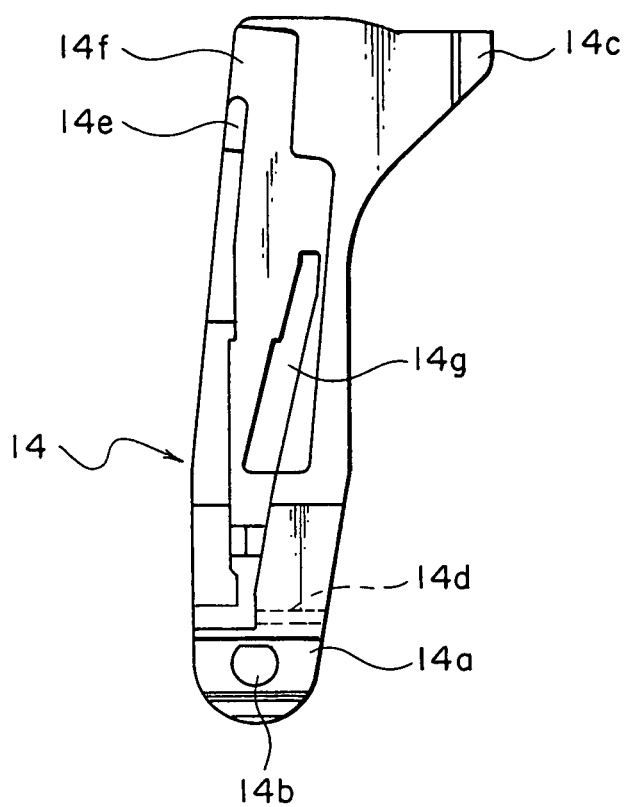
FIG. 9A is a front view of the latch member included in the latch device of FIGS. 3A to 3C.
Figure 9B:
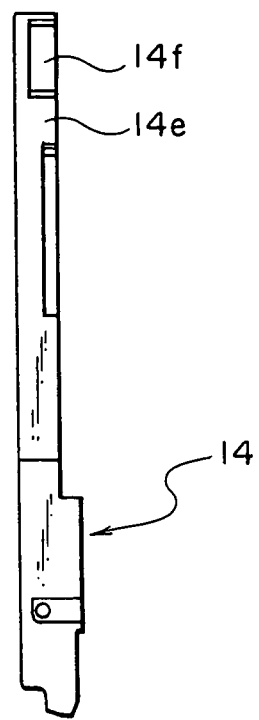
FIG. 9B is a left-side view of the latch member shown in FIG. 9A.
Figures 10A, 10B:
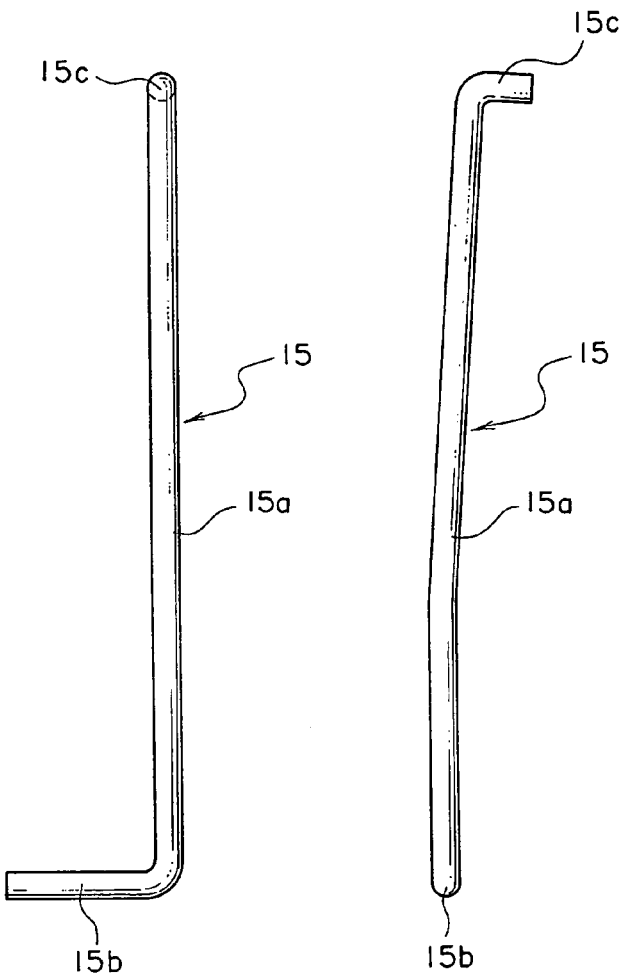
FIG. 10A is a front view of the rod spring included in the latch device of FIGS. 3A to 3C.
FIG. 10B is a bottom view of the rod spring shown in FIG. 10A.

In FIGS. 4 and 6, the latch member 14 has a small hole 14d near the shaft hole 14b. The rod spring 15 has an intermediate portion 15a extending between the cam member 13 and the latch member 14, a first end portion 15b that is bent perpendicularly from one end of the intermediate portion 15a and inserted into the small hole 14d so as to engage the latch member 14 in its swing direction, and a second end portion 15c that is bent from the other end of the intermediate portion 15a in a third direction (direction perpendicular to the sheet surface in FIG. 4 or FIG. 6) perpendicular to the first and second directions A1 and A2 so as to engage the heart cam 17 shown in FIG. 5.

In FIGS. 4 to 6, when the module 7 is inserted into the passage 8, the projected portion 7a of the module 7 engages the operating projection 13a in the first direction A1 to thereby move the cam member 13 against the biasing force of the return spring 16. According to the movement of the cam member 13, the second end portion 15c of the rod spring 15 moves following the heart cam 17. That is, the second end portion 15c of the rod spring 15 is moved by the heart cam 17. Therefore, the rod spring 15 is herein also called a cam follower.

When the second end portion 15c is moved by the heart cam 17, the rod spring 15 urges the latch member 14 toward one of the first and second positions through the first end portion 15b. Specifically, when the cam member 13 starts moving, the rod spring 15 urges the latch member 14 toward the second position. However, actual movement of the latch member 14 is controlled by a control mechanism.

Details of the base member 11, the cam member 13, the latch member 14, and the rod spring 15 are shown in FIGS. 7A and 7B, FIGS. 8A and 8B, FIGS. 9A and 9B, and FIGS. 10A and 10B, respectively. The cam member 13 has a projected portion 13b formed on the upper surface thereof near the heart cam 17. On the other hand, on a lower surface of the latch member 14 is formed a projected wall 14e that engages the projected portion 13b. The latch member 14 is provided, near the free end thereof, with a lacking portion 14f where the projected wall 14e is not formed. Further, the latch member 14 is formed with a window portion 14g passing therethrough. A combination of the projected portion 13b, the projected wall 14e, the lacking portion 14f, the window portion 14g, and the heart cam 17 is referred to as the control mechanism.

Now, referring also to FIGS. 11 to 12C, description will be given of the operation of the latch device 10 and the operation of the control mechanism.

Figure 11:
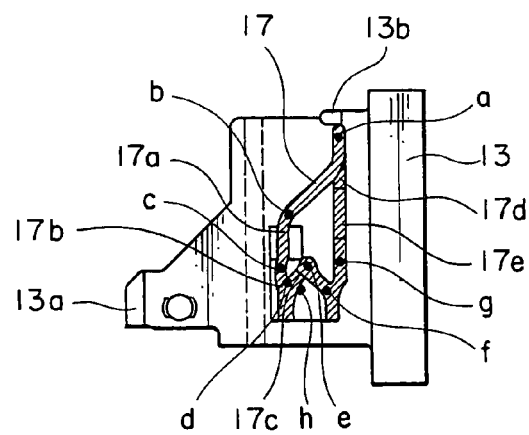
FIG. 11 is an explanatory diagram for explaining operation of a heart cam formed on the cam member of FIGS. 8A and 8B.
Figure 12A:
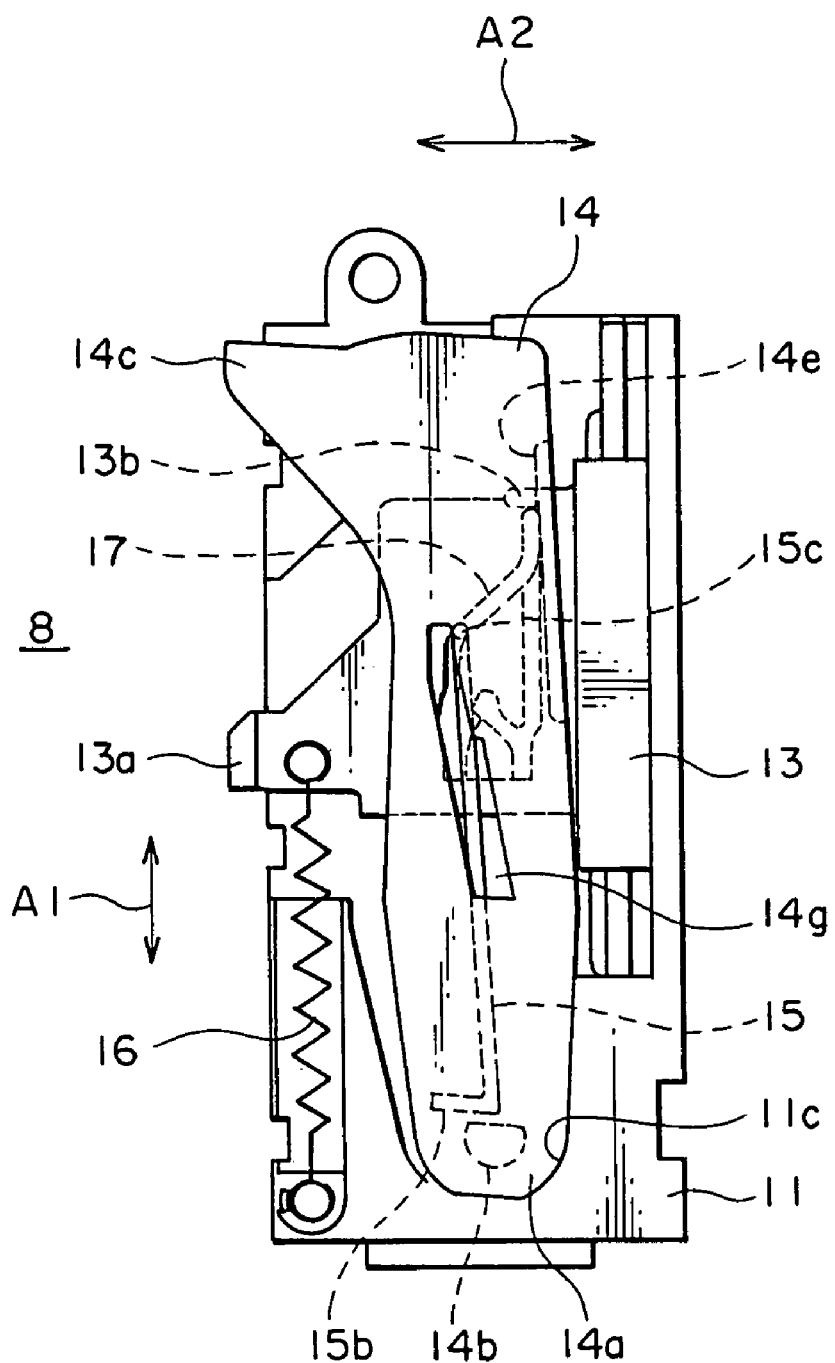
FIG. 12A is a front view like FIG. 4, showing the state where the cam member has slightly slid.
Figure 12B:
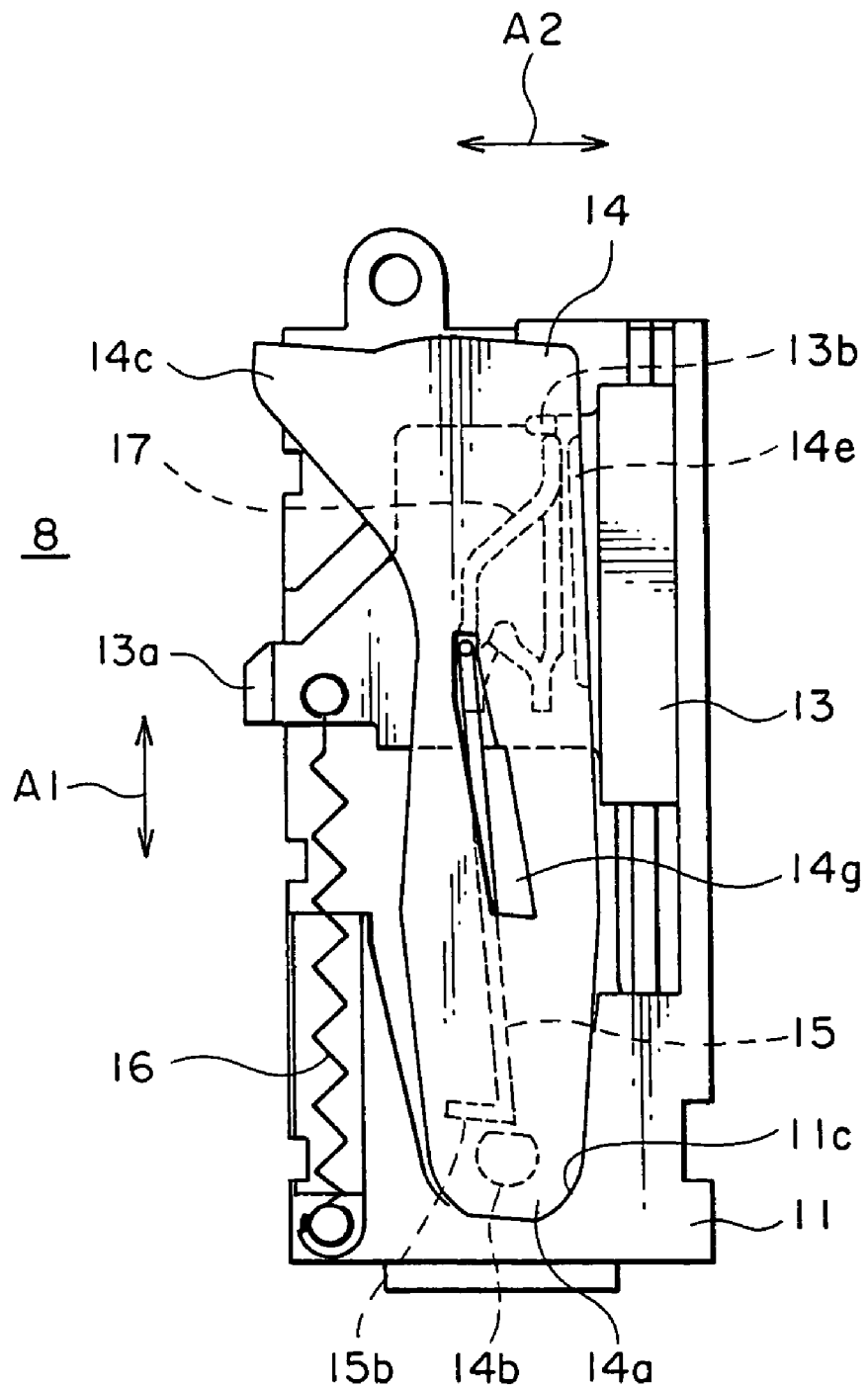
FIG. 12B is a front view like FIG. 4, showing the state where the cam member has further slid but a latch operation is not obtained.
Figure 12C:
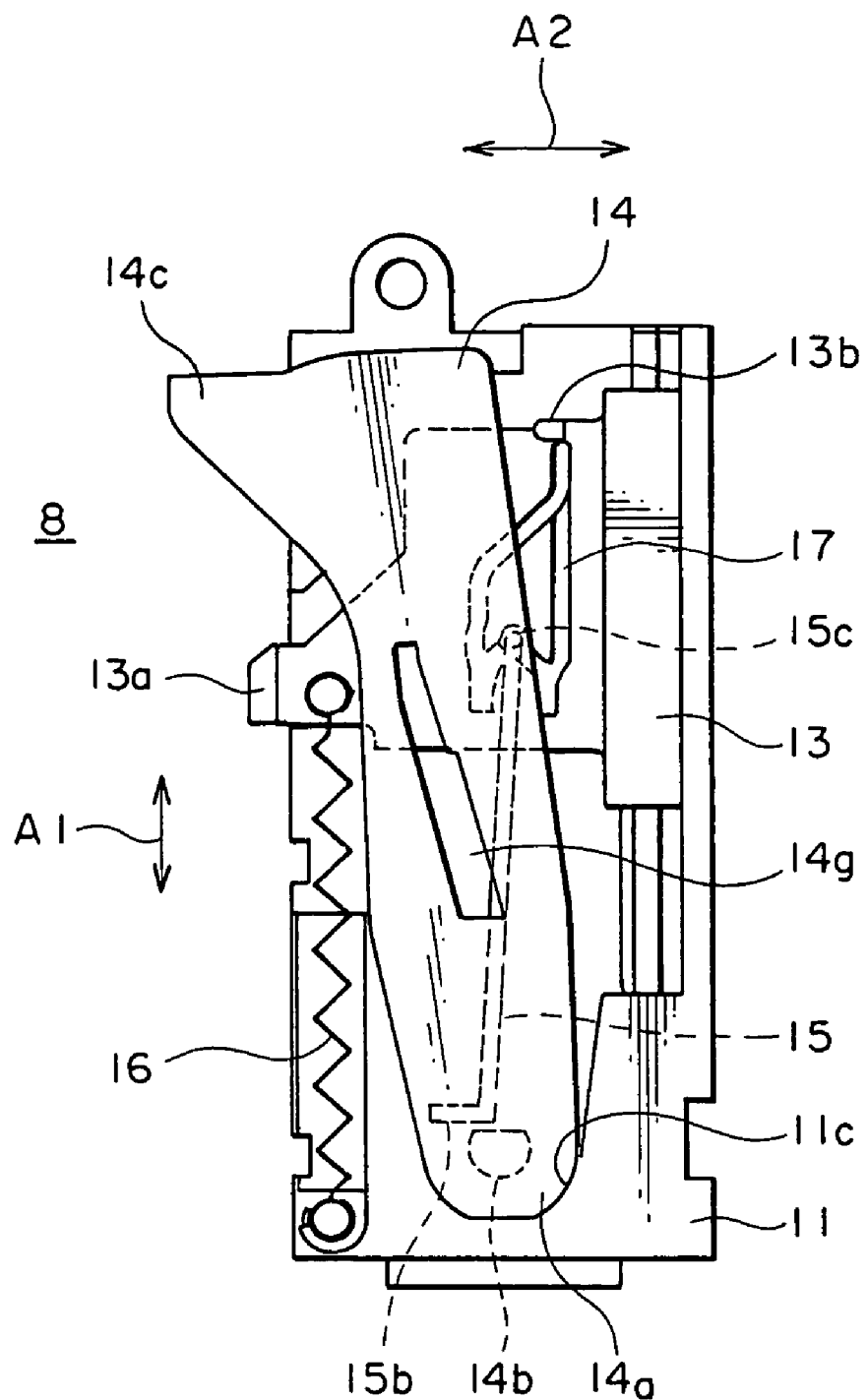
FIG. 12C is a front view like FIG. 4, showing the state where the cam member has further slid and the latch operation is obtained.

In FIG. 11, the heart cam 17 is hatched so as to be distinguished from other portions. When the module 7 is not inserted in the passage 8, the second end portion 15c of the rod spring 15 is located at a point a, i.e. a normal position, of the heart cam 17 and the latch member 14 is in the first position.

First, description will be given of a case where the module 7 is set in the information processing device 1. When an operator inserts the module 7 into the passage 8, the projected portion 7a of the module 7 engages the operating projection 13a of the cam member 13 in the first direction A1. When the module 7 is pushed, the cam member 13 moves. As a result, the second end portion 15c of the rod spring 15 moves along the heart cam 17 to reach a point b. During this movement, the rod spring 15 urges the latch member 14 toward the second position. However, since the projected portion 13b of the cam member 13 is in engagement with the projected wall 14e of the latch member 14, the latch member 14 is retained in the first position. Therefore, the rod spring 15 gradually increases elastic bending to store energy during the movement. Herein, a combination of the projected portion 13b and the projected wall 14e will be referred to as a first engaging mechanism.

At the groove bottom of the heat cam 17, there is formed, from the point b to a point c, a steep ramp 17a that gradually raises the second end portion 15c of the rod spring 15 following the sliding movement of the cam member 13. Further, from the point c to a point d of the heart cam 17, there is formed a large height difference 17b that rapidly lowers the second end portion 15c of the rod spring 15. In this manner, a protuberant portion is defined at part of the heart cam 17 by the steep ramp 17a and the large height difference 17b.

When the cam member 13 is further moved by the module 7, the second end portion 15c of the rod spring 15 gets on the protuberant portion along the heart cam 17 to reach the point c. In this event, the intermediate portion 15a of the rod spring 15 is inserted into the window portion 14g of the latch member 14. Simultaneously with or immediately after this, the projected portion 13b and the projected wall 14e disengage from each other. That is, the projected portion 13b reaches a position confronting the lacking portion 14f. However, an edge of the window portion 14g of the latch member 14 is locked by the intermediate portion 15a of the rod spring 15 in this event, the latch member 14 continues to be retained at the first position or near that position. Therefore, the rod spring 15 maintains the large stored energy. Herein, the projected portion 13b and the edge of the window portion 14g cooperatively constitute an engaging portion or a second engaging mechanism. Further, a combination of the steep ramp 17a and the lacking portion 14f will be referred to as an engagement switching mechanism that switches from the first engaging mechanism to the second engaging mechanism following the movement of the heart cam 17.

When the cam member 13 is further moved by the module 7, the second end portion 15c of the rod spring 15 passes through the large height difference 17b of the heart cam 17 to reach the point d. The second end portion 15c is rapidly lowered upon passing through the large height difference 17b so that the intermediate portion 15a of the rod spring 15 disengages from the window portion 14g of the latch member 14. Then, the latch member 14 is completely released and therefore rapidly moves toward the second position by the stored energy of the rod spring 15. Herein, the large height difference 17b of the heart cam 17 serves as an engagement release mechanism that releases the operation of the foregoing second engaging mechanism.

As a result, the engaging portion 14c of the latch member 14 protrudes into the passage 8 and is inserted into the recessed portion 7b of the module 7. Therefore, the module 7 is disposed at a predetermined position of the information processing device 1 and locked by the latch member 14 so as to be prevented from detachment.

Upon the disengagement of the intermediate portion 15a of the rod spring 15 from the window portion 14g of the latch member 14, the second end portion 15c of the rod spring 15 is urged to move in a direction opposite to the latch member 14 by the stored energy of the rod spring 15. However, the movement thereof is restricted due to its collision with a wall portion of the cam member 13 at a point h of the heart cam 17.

When the module 7 is locked by the latch member 14, the insertion force of the module 7 may be released. When the insertion force of the module 7 is released, the cam member 13 is slightly returned by the return spring 16 so that the second end portion 15c of the rod spring 15 is stopped in the state where it is located at a point e. In addition, the projected portion 13b of the cam member 13 confronts the projected wall 14e of the latch member 14 in the second direction A2. Therefore, the latch member 14 is prevented from returning to the first position from the second position.

Now, description will be given of a case where the module 7 is removed from the information processing device 1. In this case, the operator slightly pushes the module 7. Then, the second end portion 15c of the rod spring 15 moves to a point f. In that event, the latch member 14 is pushed by the second end portion 15c of the rod spring 15 so as to be moved and returned to the first position. As a result, the projected portion 13b of the cam member 13 enters the lacking portion 14f of the latch member 14.

When the pushing force to the module 7 is released, the second end portion 15c of the rod spring 15 moves to a point g. From this point, the projected portion 13b of the cam member 13 engages the projected wall 14e to provide the state where the first engaging mechanism is operated. Thereafter, the cam member 13 is returned to the initial position by the return spring 16. Therefore, the module 7 is pushed out of the passage 8 by the operating projection 13a of the cam member 13. In this event, the second end portion 15c of the rod spring 15 is returned to the point a, i.e. the normal position.

In order to prevent backward movement of the second end portion 15c of the rod spring 15, the heart cam 17 is formed with low stepped portions 17c and 17d, a gentle ramp 17e, and so on at several portions.

The rod spring 15 also has a function as an elastic member to urge and move the latch member 14 in the direction crossing the slide direction (A1) of the cam member 13.

Referring to FIGS. 13-19 in addition, the latch device 10 will be described in detail.

Figure 13:
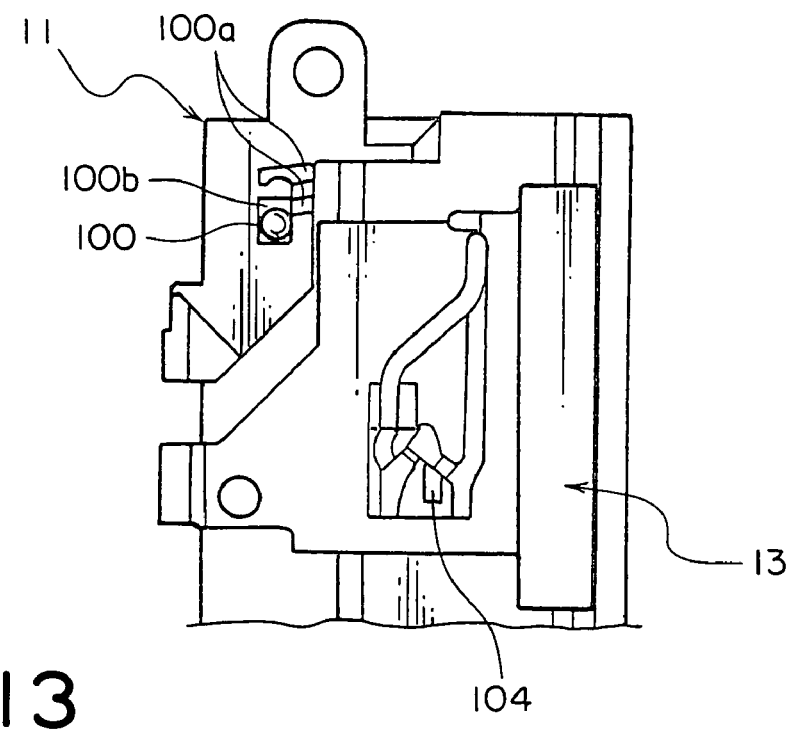
FIG. 13 is a front view showing a portion of FIG. 5 in detail.
Figure 14:
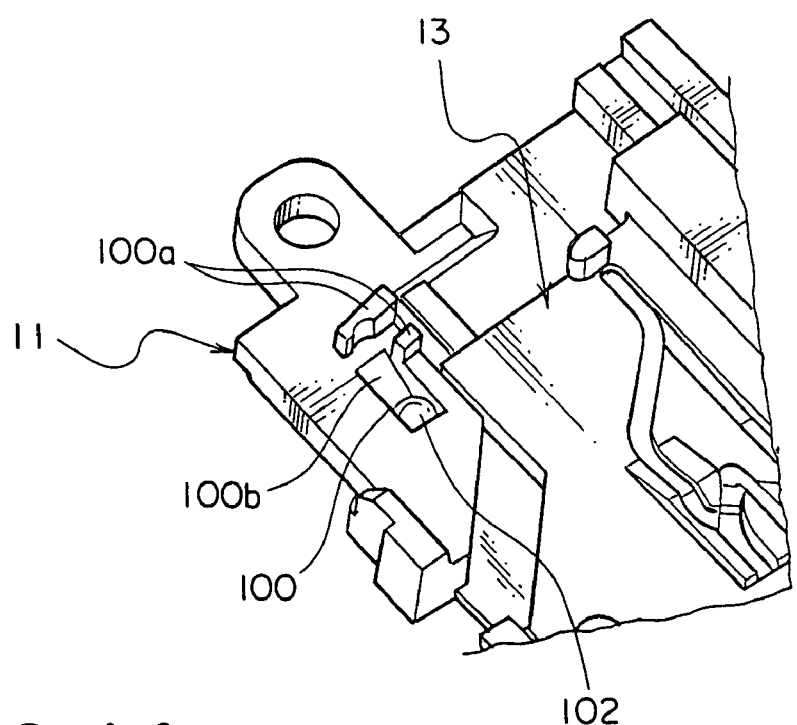
FIG. 14 is a perspective view of the portion illustrated in FIG. 13.

In FIGS. 13 and 14 showing only a portion of FIG. 5 in detail, the base member 11 is formed with a guide groove 100 and two projections 100a. The guide groove 100 has a shape including a slant surface 100b. A metal ball 102 is placed in the guide groove 100. The guide groove 100 has a depth determined so that the metal ball 102 does not overflow from the guide groove 110. The metal ball 102 serves to lock the lath member at the second position. In other words, the metal ball 102 is referred to as a lock member for locking a latch state of the latch device 10. In the manner which will later become clear, the metal ball 102 is movable between a lock position of the latch device 10 and an unlock position thereof.

Figure 15:
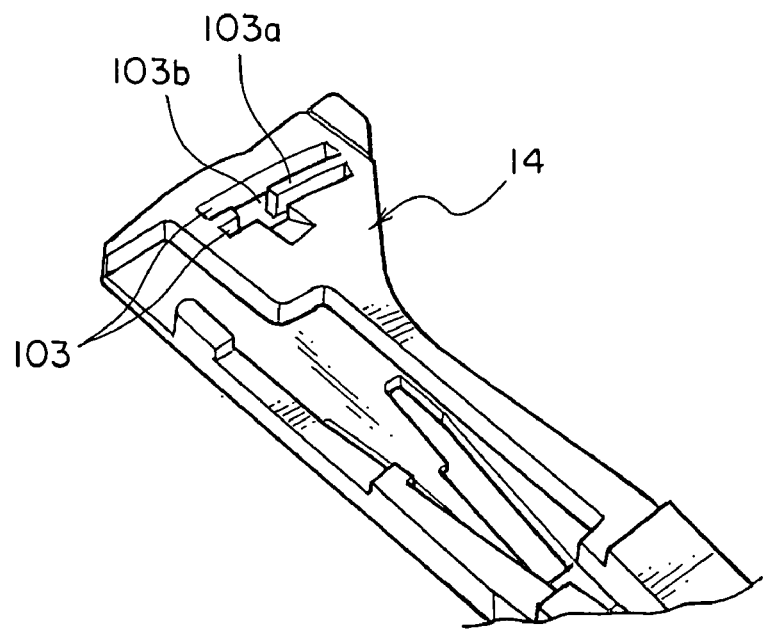
FIG. 15 is a perspective view showing a portion the latch member of FIGS. 9A and 9B in detail as seen from a reverse side.
Figure 16:
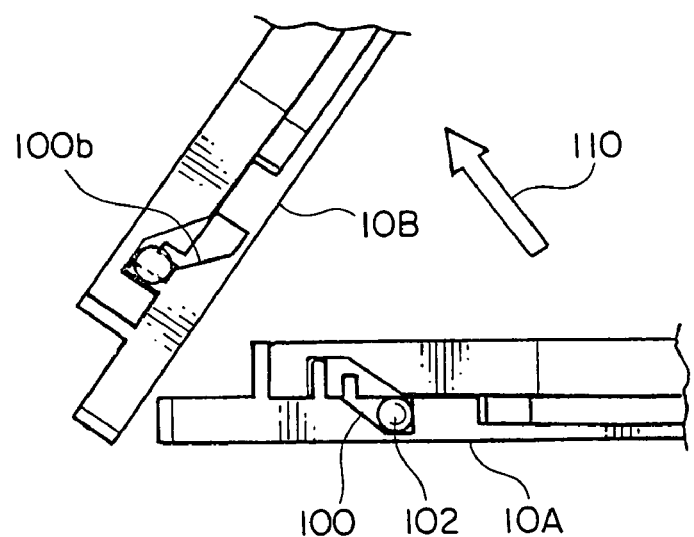
FIG. 16 is a view for describing variation of posture of the latch device illustrated in FIGS. 3A-3C.
Figure 17:
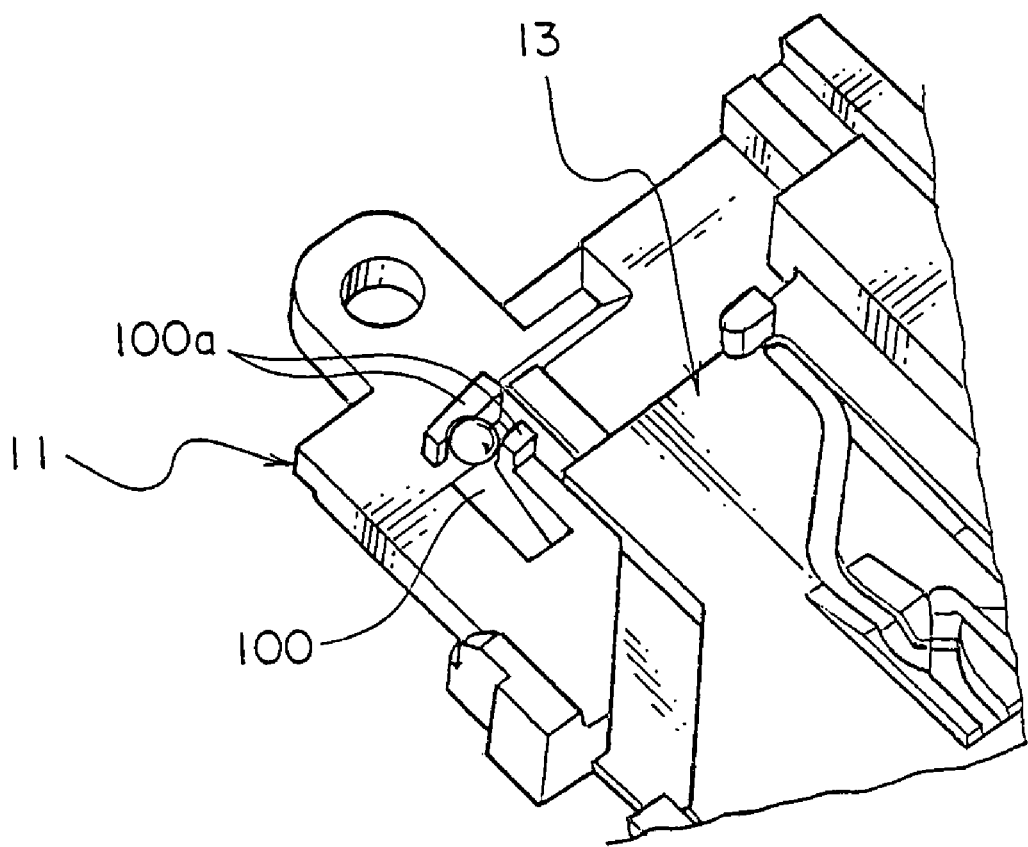
FIG. 17 is a perspective view similar to FIG. 14, in which the posture of the latch device is changed.
Figure 18:
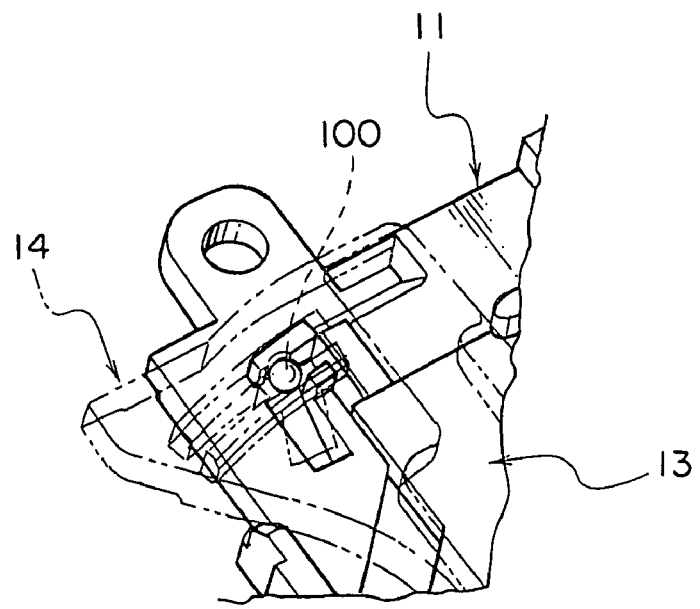
FIG. 18 is a transparent perspective view showing a portion of the latch device of FIGS. 3A-3C.

In FIG. 15, the latch member 14 is formed with two escaping groove 103 for escaping the projections 100a. Thus, the latch device 10 is designed so that, when rotated, the latch member 14 can smoothly be moved without being interfered to the base member 11.

The latch device 10 is normally kept to have a horizontal posture. The latch device 10 horizontal is depicted by a reference numeral 10A in FIG. 16. In this state, the metal ball 102 is placed in the unlock position, that is, a deepest part of the guide groove 100 by an action of the slant surface 100b of the guide groove 100.

It will be assumed here that the latch device 10 is inclined towards an arrow 110 to make the slant surface 100b be parallel to a horizontal plane. The latch device 10 inclined is depicted by a reference numeral 10B in FIG. 16. When the latch device is further inclined so that the slant surface 100b exceeds the horizontal plane, the metal ball 102 moves along the guide groove 100 to stop at the lock position, that is, a position adjacent to the projections 100a clearly illustrated in FIG. 17. When stopped at the lock position, the metal ball 102 is placed in a recessed portion 103b formed in a wall portion 103a which is between the escaping grooves 103 of the latch member 14. As a result, the metal ball 102 is interposed between the projections 100a of the base member 11 and the wall portion 103a of the latch member 14.

Figure 19:
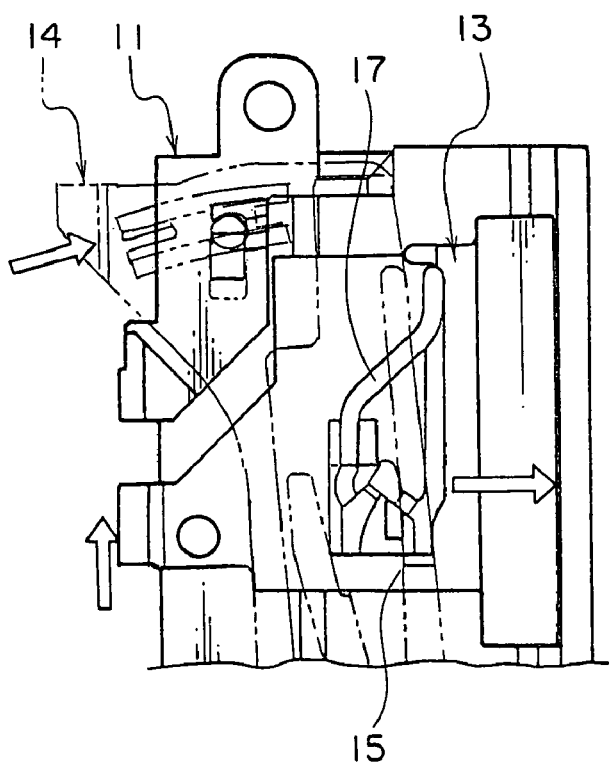
FIG. 19 is a transparent plan view of the portion illustrated in FIG. 18.

It will be assumed as a particular case that external force acts to the cam member 13 as shown by an arrow 120 in FIG. 19. In the particular case, with being dependent on the heart cam 17 of the cam member 13, the latch member 14 starts rotating thereof as shown by an arrow 130 in FIG. 19. However, the latch state of the latch device 10 is not released. This is because the metal ball 102 is pinched between the projections 100a of the base member 11 and the wall portion 103a of the latch member 14 to thereby be limited a movable range thereof. In this event, the cam member 13 receives force towards a direction shown by an arrow 140 in FIG. 19.

It is noted here that the arrows 120, 130, and 140 are directed different to one another. This means that the external force is dispersed to act as small force to various parts or portions. As will be described above, the base member 11 and the latch member 14 are fitted to each other with concavity and convexity structure. Inasmuch as the external force is dispersed, the concavity and convexity structure can be designed small.

Since the external force is transmitted to the rod spring 15 from the cam member 13 though the heart cam 17, the biggest load acts on the rod spring 15 and the heart cam 17. Accordingly, it is preferable to provide sufficient strength in each of the rod spring 15 and the heart cam 17. For this purpose, the heart cam 17 is provided with an additional groove 104 which receives the rod spring 15 when the load exceeds a prescribed value. When the external force is released, the rod spring 15 is escaped from the additional groove 104 by the return spring 16. Therefore, the latch device 10 is returned to the latch state.

While the present invention has thus far been described in connection with a single embodiment thereof, it will readily be possible for those skilled in the art to put this invention into practice in various other manners. For example, it may be designed such that when the module 7 is inserted, an insertion end thereof, instead of the projected portion 7a thereof, engages the operating projection 13a of the cam member 13. Further, the latch member 14 may be formed with a non-through recessed portion instead of the through window portion 14g. Further, the generally heart-shaped groove forming the heart cam 17 may be inclined with respect to the foregoing predetermined plane. In addition, the present invention is applicable not only to an information processing device such as a computer, but also to various devices or apparatuses each required to latch a movable object member. It is a matter of course that use may be made of a plastic ball or the like instead of using the metal ball. Such a ball may be used at least one of between the latch member 14 and the cam member 13 and between the base member 11 and the cam member 13 in the manner similar to the above-mentioned metal ball 100.

What is claimed is:

1. A latch device for latching an object member movable in a predetermined direction, the latch device comprising:

a base member;

a cam member mounted on the base member for following movement of the object member;

a latch member mounted on the base member and movable between a first position where the latch member does not engage the object member and a second position where the latch member engages the object member;

a control mechanism coupled to the cam member and the latch member for controlling movement of the latch member depending on the number of times of movement of the cam member; and a lock member interposed between the base member and at least one of the cam member and the latch member for locking the latch member at the second position to prevent a release of the object member from the latch device, the lock member being movable between a lock position where the lock member limits movement of at least one of the cam member and the latch member relative to the base member and a non-lock position where the lock member does not limit movement of at least one of the cam member and the latch member relative to the base member, the lock member comprising a ball which is placed at the non-lock position when the latch device has a desired posture, the ball moving from the non-lock position towards the lock position when the latch device is inclined to exceed a predetermined angle from the desired posture.

2. The latch device according to claim 1, wherein the cam member has a heart cam, the control mechanism comprising a cam follower engaged with the heart cam and the latch member to urge the latch member following movement of the heart cam.

3. The latch device according to claim 2, wherein the control mechanism controls movement of the latch member depending on a shape of the heart cam in addition to the number of times of movement of the cam member.

4. The latch device according to claim 2, wherein the cam follower comprises a rod spring comprising a first end portion engaged with the latch member and a second end portion engaged with the heart cam.

5. The latch device according to claim 4, wherein the rod spring further comprises an intermediate portion substantially extending in the predetermined direction, the first end portion located at one end of the intermediate portion and engaging the latch member in a swing direction, the second end portion being bent perpendicularly from the other end of the intermediate portion and engaging the heart cam.

6. The latch device according to claim 5, wherein the heart cam has a generally heart-shaped groove formed on the cam member, the generally heart-shaped groove has a protuberant portion defined by a ramp that gradually raises the second end portion following sliding movement of the cam member and a height difference that rapidly lowers the second end portion, and the latch member has an engaging portion that engages the intermediate portion when the second end portion gets on the protuberant portion, to thereby retain the latch member at the first position.

7. The latch device according to claim 1, wherein the control mechanism comprises:
   a latch locking mechanism coupled to the latch member for forcibly locking the latch member at the first position; and
   a latch release mechanism coupled to the latch locking mechanism and the cam member for releasing operation of the latch locking mechanism depending on the movement of the cam member.

8. A latch device for latching an object member movable in a predetermined direction, the latch device comprising:
   a base member;
   a cam member mounted on the base member for following movement of the object member;
   a latch member mounted on the base member and movable between a first position where the latch member does not engage the object member and a second position where the latch member engages the object member;
   a control mechanism coupled to the cam member and the latch member for controlling movement of the latch member depending on the number of times of movement of the cam member, the control mechanism comprising a cam follower; and
   a lock member interposed between the base member and at least one of the cam members and the latch member for locking the latch member at the second position to prevent a release of the object member from the latch device, the lock member being movable between a lock position where the lock member limits movement of at least one of the cam members and the latch member relative to the base member and a non-lock position where the lock member does not limit movement of at least one of the cam members and the latch member relative to the base member, wherein the latch member is swingable about a fulcrum at one end thereof relative to the base member in a predetermined plane, the cam member being disposed between the latch member and the base member and attached to the base member so as to be slidable in the predetermined direction, the cam follower comprising a rod spring having a first end portion engaged with the latch member and a second end portion engaged with the heart cam, the latch device further comprising a return spring urging the cam member toward one side in the predetermined direction.

9. The latch device according to claim 8, further comprising a cover member coupled to the base member, wherein the cam member, the latch member, the rod spring, and the return spring are disposed between the base member and the cover member.

\* \* \* \* \*